United States Patent
Strock et al.

(10) Patent No.: US 12,330,991 B2
(45) Date of Patent: Jun. 17, 2025

(54) TURBINE ENGINE ABRADABLE SYSTEMS

(71) Applicant: RTX Corporation, Farmington, CT (US)

(72) Inventors: Christopher W. Strock, Boothbay Harbor, ME (US); Kevin C. Seymour, Riviera Beach, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/283,882

(22) PCT Filed: Mar. 24, 2022

(86) PCT No.: PCT/US2022/021678
§ 371 (c)(1),
(2) Date: Sep. 25, 2023

(87) PCT Pub. No.: WO2022/204367
PCT Pub. Date: Sep. 29, 2022

(65) Prior Publication Data
US 2024/0158303 A1    May 16, 2024

Related U.S. Application Data (63) Continuation-in-part of application No. 17/760,936, filed as application No. PCT/US2020/021567 on Mar. 6, 2020.
(Continued)

(51) Int. Cl.
*C04B 35/46*     (2006.01)
*C04B 35/10*     (2006.01)
(Continued)

(52) U.S. Cl.
CPC .............. *C04B 35/46* (2013.01); *C04B 35/10* (2013.01); *C04B 35/16* (2013.01); *C04B 35/48* (2013.01);
(Continued)

(58) Field of Classification Search
CPC ................................. C04B 35/46; C23C 4/10
See application file for complete search history.

(56) References Cited

U.S. PATENT DOCUMENTS 6,884,470 B2   4/2005   Gorman
6,887,036 B2   5/2005   Ohara et al.
(Continued)

FOREIGN PATENT DOCUMENTS

EP           0661415 A1   7/1995
WO     2011/008719 A1   1/2011
WO     2021/055004 A1   3/2021

OTHER PUBLICATIONS

International Search Report and Written Opinion dated Jul. 31, 2020 for PCT/US2020/021567.
(Continued)

*Primary Examiner* — Robert A Vetere
(74) *Attorney, Agent, or Firm* — Bachman & LaPointe, P.C.

(57) ABSTRACT

In a method for forming an abradable material (36), the abradable material has at least 20% by volume rutile titania (44) and hBN (46). The method includes: blending a first titania powder having an oxygen debit of at least 5.0% with a second titania powder having an oxygen debit, if any, of less than 1.0%. The blend is thermal sprayed. The sprayed blend is then oxidized.

20 Claims, 3 Drawing Sheets

Related U.S. Application Data (60) Provisional application No. 63/320,938, filed on Mar. 17, 2022, provisional application No. 63/165,505, filed on Mar. 24, 2021, provisional application No. 62/903,295, filed on Sep. 20, 2019.

(51) Int. Cl.
*C04B 35/16* (2006.01)
*C04B 35/48* (2006.01)
*C04B 35/583* (2006.01)
*C23C 4/10* (2016.01)
*C23C 4/12* (2016.01)
*C23C 4/18* (2006.01)
*F01D 11/12* (2006.01)

(52) U.S. Cl.
CPC .............. *C04B 35/583* (2013.01); *C23C 4/10* (2013.01); *C23C 4/12* (2013.01); *C23C 4/18* (2013.01); *C04B 2235/3217* (2013.01); *C04B 2235/3237* (2013.01); *C04B 2235/3244* (2013.01); *C04B 2235/3445* (2013.01); *C04B 2235/3463* (2013.01); *C04B 2235/349* (2013.01); *C04B 2235/386* (2013.01); *C04B 2235/767* (2013.01); *F01D 11/122* (2013.01); *F05D 2230/90* (2013.01)

(56) References Cited

U.S. PATENT DOCUMENTS

| | | | |
|---|---|---|---|
| 7,510,370 | B2 | 3/2009 | Strangman et al. |
| 10,060,281 | B2 | 8/2018 | Strock et al. |
| 2009/0258247 | A1 | 10/2009 | Kulkarni et al. |
| 2011/0164961 | A1 | 7/2011 | Taylor |
| 2013/0071235 | A1* | 3/2013 | Strock .................. F01D 11/122 415/174.4 |
| 2018/0155820 | A1* | 6/2018 | Simons ................. C23C 14/083 |

OTHER PUBLICATIONS

International Search Report and Written Opinion dated Aug. 18, 2022 for PCT/US2022/021678.

* cited by examiner

TURBINE ENGINE ABRADABLE SYSTEMS

CROSS-REFERENCE TO RELATED APPLICATIONS

This application claims benefit and priority of U.S. patent application Ser. No. 63/320,938, filed Mar. 17, 2022, and entitled "Turbine Engine Abradable Systems", and U.S. patent application Ser. No. 63/165,505, filed Mar. 24, 2021, and entitled "Turbine Engine Abradable Systems", and is a continuation-in-part of International Application No. PCT/US20/21567 (which entered the US national stage as Ser. No. 17/760,936), filed Mar. 6, 2020 and entitled "Turbine Engine Abradable Systems" which claims benefit of U.S. patent application Ser. No. 62/903,295, filed Sep. 20, 2019, and entitled "Turbine Engine Abradable Systems", the disclosures of all of which applications are incorporated by reference herein in their entireties as if set forth at length.

BACKGROUND

The disclosure relates to gas turbine engines. More particularly, the disclosure relates to high temperature turbine engine abradable systems.

Gas turbine engines (used in propulsion and power applications and broadly inclusive of turbojets, turboprops, turbofans, turboshafts, industrial gas turbines, and the like) use abradable seal systems in multiple locations to seal between relatively rotating components. The main situation involves the interface between blade tips and adjacent static structure. Other situations include interfaces between inner diameter (ID) vane tips and rotating structure such as a shaft. In typical systems there is an abrasive coating on one of the relatively rotating members and an abradable coating on the other.

The nature of the abradable-abrasive pair depends on location in the engine and other relevant considerations including operating temperature. One class of such pairs involves: ceramic abradable coatings; and abrasive coatings formed by ceramic abrasive particles in a metallic matrix. Such pairs may be used in relatively high temperature locations in a compressor (e.g., relatively downstream such as in the final compressor section of a multi-section compressor (e.g., high pressure compressor (HPC)). An example such coating involves the abradable coating on the inner diameter (ID) surface of a blade outer airseal (BOAS) (e.g., segmented or full annulus) and the abrasive coating on tips of the airfoils of the adjacent stage of blades. Typical BOAS and blade substrate materials are nickel-based superalloys. A bondcoat (e.g., a diffusion aluminide or an air plasma sprayed (APS) or PVD MCrAlY) may intervene between the ceramic abradable coating (e.g., thermal sprayed) and BOAS substrate. The abrasive coating matrix (e.g., nickel) with abrasive (e.g., cubic boron nitride (cBN) sublimation point 3,246 K)) may be directly plated (e.g., electroplated) to the blade substrate.

SUMMARY

One aspect of the disclosure involves a method for coating a substrate, the method comprising: blending a first ceramic powder having an oxygen debit of at least 5.0% with a second ceramic powder having an oxygen debit, if any, of less than 1.0%; and thermal spraying the blend.

A further embodiment of any of the foregoing aspects or embodiments may additionally and/or alternatively include oxidizing the sprayed blend to reduce a net oxygen debit by at least 50%.

A further embodiment of any of the foregoing aspects or embodiments may additionally and/or alternatively include the first ceramic powder forming 5% to 75% by volume of the as-sprayed blend.

A further embodiment of any of the foregoing aspects or embodiments may additionally and/or alternatively include: the first ceramic powder forming 5% to 50% by weight of the combined first ceramic powder and second ceramic powder in the blend; and the second ceramic powder forming 50% to 95% by weight of the combined first ceramic powder and second ceramic powder in the blend.

A further embodiment of any of the foregoing aspects or embodiments may additionally and/or alternatively include the first ceramic powder and the second ceramic powder combining to form at least 40% by volume of a layer sprayed from the blend.

A further embodiment of any of the foregoing aspects or embodiments may additionally and/or alternatively include the first ceramic powder being Magnéli phase titania; and the second ceramic powder being $TiO_2$.

A further embodiment of any of the foregoing aspects or embodiments may additionally and/or alternatively include the first ceramic powder and the second ceramic powder being oxides or silicates of different elements.

A further embodiment of any of the foregoing aspects or embodiments may additionally and/or alternatively include: the first ceramic powder being a zirconia and the second ceramic powder being an alumina.

A further embodiment of any of the foregoing aspects or embodiments may additionally and/or alternatively include the first ceramic powder and the second ceramic powder being oxides or silicates of the same element.

A further embodiment of any of the foregoing aspects or embodiments may additionally and/or alternatively include the first ceramic powder being a silicate and the second ceramic powder being a silicate.

A further embodiment of any of the foregoing aspects or embodiments may additionally and/or alternatively include the first ceramic powder being a yttrium silicate; and the second ceramic powder being a yttrium silicate.

A further embodiment of any of the foregoing aspects or embodiments may additionally and/or alternatively include the thermal spraying being atop a metallic substrate, optionally there being an intervening bondcoat.

A further embodiment of any of the foregoing aspects or embodiments may additionally and/or alternatively include the thermal spraying being atop a ceramic or ceramic matrix composite substrate, optionally there being an intervening bondcoat.

A further embodiment of any of the foregoing aspects or embodiments may additionally and/or alternatively include the blend forming a matrix and being co-sprayed with a porosity former and a filler.

A further embodiment of any of the foregoing aspects or embodiments may additionally and/or alternatively include the matrix forming 55% to 70% by volume of an abradable layer of an outer air seal.

A further embodiment of any of the foregoing aspects or embodiments may additionally and/or alternatively include the filler comprising hBN at 20% to 35% by volume of the abradable layer.

A further embodiment of any of the foregoing aspects or embodiments may additionally and/or alternatively include the filler further comprising bentonite binding said hBN wherein by weight the bentonite is between 5.0% and 25.0% of the combined bentonite and hBN.

A further embodiment of any of the foregoing aspects or embodiments may additionally and/or alternatively include an outer air seal and blade combination comprising: an outer airseal made according to the method; and a blade having an abrasive tip coating positioned to rub the abradable layer.

A further embodiment of any of the foregoing aspects or embodiments may additionally and/or alternatively include the abrasive tip coating comprising a nickel or nickel phosphorous matrix and a single crystal cubic boron nitride or unstabilized zirconia abrasive.

A further embodiment of any of the foregoing aspects or embodiments may additionally and/or alternatively include the abrasive tip coating comprising a nickel or nickel phosphorous matrix and a zirconia-toughened alumina abrasive.

Another aspect of the disclosure involves an abradable material comprising: at least 20% by volume rutile titania; and hBN.

A further embodiment of any of the foregoing aspects or embodiments may additionally and/or alternatively include bentonite binding said hBN wherein by weight the bentonite is between 5.0% and 25.0% of the combined bentonite and hBN.

In a further embodiment of any of the foregoing aspects or embodiments the hBN is agglomerated with the bentonite and the agglomerate is co-sprayed with the first titania powder and the second titania powder.

A further embodiment of any of the foregoing aspects or embodiments may additionally and/or alternatively include the abradable material comprising at least 10% by volume said hBN.

A further embodiment of any of the foregoing aspects or embodiments may additionally and/or alternatively include the abradable material comprising: at least 35% by volume said hBN.

A further embodiment of any of the foregoing aspects or embodiments may additionally and/or alternatively include a method forming the abradable material, the method comprising: blending a first titania powder having an oxygen debit of at least 5.0% with a second titania powder having an oxygen debit, if any, of less than 1.0%; thermal spraying the blend; and oxidizing the sprayed blend. The blending may be a pre-blending (e.g., in a single hopper) or fed from two hoppers to mix for spraying or co-sprayed from two spray guns to mix in the spray.

In a further embodiment of any of the foregoing aspects or embodiments the hBN is pre-blended with the first titania powder and the second titania powder.

In a further embodiment of any of the foregoing aspects or embodiments the blend is co-sprayed with a fugitive porosity-former.

In a further embodiment of any of the foregoing aspects or embodiments the abradable material is sprayed on an inner diameter surface of a blade outer airseal substrate optionally atop a bond coat.

Another aspect of the disclosure involves a turbine engine comprising: a first member having a surface bearing an abradable coating, the abradable coating being at least 90% by weight ceramic; and a second member having a surface bearing an abrasive coating. The abrasive coating comprises a metallic matrix and a ceramic oxide abrasive held by the metallic matrix. The first member and second member are mounted for relative rotation with the abrasive coating facing or contacting the abradable coating. At least 50% by weight of the ceramic abrasive has a melting point at least 400K higher than a melting point of at least 20% by weight of the ceramic of the abradable coating (and/or at least 80% by weight of the matrix of the abradable coating). Alternatively, the two powders may be co-sprayed from separate sources and guns (e.g., to blend in-flight). In one or more embodiments, this may be made by any of the foregoing methods or below-described methods or from or having particular foregoing materials and properties or below-described materials and properties.

In a further embodiment of any of the foregoing aspects or embodiments the blending may be a pre-blending (e.g., in a single hopper) or fed from two hoppers to mix for spraying or co-sprayed from two spray guns to mix in the spray. If fed from two hoppers or sprayed from two guns, the ratio may be varied during spraying.

A further embodiment of any of the foregoing aspects or embodiments may additionally and/or alternatively include the abradable coating having cohesive strength 800 psi to 3000 psi (5.5 MPa to 20.7 MPa).

A further embodiment of any of the foregoing aspects or embodiments may additionally and/or alternatively include the ceramic oxide abrasive forming at least 5% by weight of the abrasive coating.

A further embodiment of any of the foregoing aspects or embodiments may additionally and/or alternatively include at least 90% by weight of the ceramic oxide abrasive having a melting point at least 400K higher than a melting point of at least 20% by weight of the ceramic of the abradable coating (and/or at least 80% by weight of the matrix of the abradable coating).

A further embodiment of any of the foregoing aspects or embodiments may additionally and/or alternatively include at least 90% by weight of the ceramic oxide abrasive having a melting point 400K to 1850K higher than a melting point of at least 20% by weight of the ceramic of the abradable coating (and/or at least 80% by weight of the matrix of the abradable coating).

A further embodiment of any of the foregoing aspects or embodiments may additionally and/or alternatively include at least 90% by weight of the ceramic oxide abrasive having a melting point 400K to 1850K higher than a melting point of at least 20% by weight of the ceramic of the abradable coating (and/or at least 80% by weight of the matrix of the abradable coating).

A further embodiment of any of the foregoing aspects or embodiments may additionally and/or alternatively include the abradable ceramic comprising a ceramic matrix and a ceramic filler. The ceramic filler is softer than the ceramic matrix.

A further embodiment of any of the foregoing aspects or embodiments may additionally and/or alternatively include the ceramic filler having a melting temperature or a sublimation temperature higher than a melting point of said ceramic matrix.

A further embodiment of any of the foregoing aspects or embodiments may additionally and/or alternatively include the ceramic filler having a Mohs hardness 5.0 or less.

A further embodiment of any of the foregoing aspects or embodiments may additionally and/or alternatively include the ceramic filler being selected from the group consisting of: HBN; and Magnéli phase titanium oxide.

A further embodiment of any of the foregoing aspects or embodiments may additionally and/or alternatively include the metallic matrix of the abrasive coating being an MCrAlY.

A further embodiment of any of the foregoing aspects or embodiments may additionally and/or alternatively include the first member comprising a blade outer airseal substrate having an inner diameter surface and a bondcoat atop the inner diameter surface, the abradable coating atop the bondcoat.

A further embodiment of any of the foregoing aspects or embodiments may additionally and/or alternatively include: the at least 50% by weight of the ceramic oxide abrasive being selected from the group consisting of: zirconia, partially stabilized zirconia, chromia, and mixtures thereof; and/or the at least 20% by weight of the ceramic of the abradable coating (and/or at least 80% by weight of the matrix of the abradable coating) being mullite.

A further embodiment of any of the foregoing aspects or embodiments may additionally and/or alternatively include: the at least 50% by weight of the ceramic oxide abrasive being selected from the abrasives listed in Table I; and the at least 20% by weight of the ceramic of the abradable coating being selected from the abradable matrices listed in Table I but meeting the identified Table I melting point and hardness criteria.

A further embodiment of any of the foregoing aspects or embodiments may additionally and/or alternatively include: the abradable ceramic comprising a ceramic matrix and a ceramic filler; and the ceramic filler being listed in Table III as an abradable filer.

A further embodiment of any of the foregoing aspects or embodiments may additionally and/or alternatively include: the at least 50% by weight of the ceramic oxide abrasive being 7YSZ; and the at least 20% by weight of the ceramic of the abradable coating (and/or at least 80% by weight of the matrix of the abradable coating) being mullite.

A further embodiment of any of the foregoing aspects or embodiments may additionally and/or alternatively include: the at least 50% by weight of the ceramic oxide abrasive being chromium oxide; and the at least 20% by weight of the ceramic of the abradable coating (and/or at least 80% by weight of the matrix of the abradable coating) being rutile titania.

A further embodiment of any of the foregoing aspects or embodiments may additionally and/or alternatively include: the at least 50% by weight of the ceramic oxide abrasive being zirconia-toughened alumina (e.g., 2% to 20% zirconia by weight); and the at least 20% by weight of the ceramic of the abradable coating (and/or at least 80% by weight of the matrix of the abradable coating) being enstatite.

A further embodiment of any of the foregoing aspects or embodiments may additionally and/or alternatively include the at least 50% by weight of the ceramic oxide abrasive being selected from the group consisting of: partially-stabilized zirconia; zirconia-toughened alumina; and chromium oxide.

A further embodiment of any of the foregoing aspects or embodiments may additionally and/or alternatively include: the at least 50% by weight of the ceramic oxide abrasive being selected from the group consisting of: partially-stabilized zirconia; zirconia-toughened alumina; and chromium oxide; and/or the at least 50% by weight of the ceramic of the abradable coating is selected from the group consisting of: mullite; rutile titania; and enstatite.

A further embodiment of any of the foregoing aspects or embodiments may additionally and/or alternatively include a method for using the turbine engine. The method comprises: running the engine to relatively rotate the first member and the second member; and the running causing the abrasive coating to contact and cut the abradable coating.

A further embodiment of any of the foregoing aspects or embodiments may additionally and/or alternatively include, during the running, in absolute temperature, the local maximum operating temperature being at most 60% the melting point of at least 50% by weight of the ceramic of the abradable coating.

In a further embodiment of any of the foregoing aspects or embodiments additionally or alternatively, the blend forms a layer of a coating on a gas turbine engine component. In various embodiments, the layer may be a barrier layer. The barrier layer may lack filler. Or the layer may be an abradable layer. The abradable layer may include filler and may include porosity let by a fugitive porosity former. The barrier layer may be below an abradable layer.

Another aspect of the disclosure involves an abradable material comprising: at least 20% by volume mullite; and at least 35% by volume Magnéli phase titanium oxide.

A further embodiment of any of the foregoing aspects or embodiments may additionally and/or alternatively include the abradable material further comprising a remainder by volume being at least one of porosity, impurities, and fugitive.

A further embodiment of any of the foregoing aspects or embodiments may additionally and/or alternatively include a blade outer airseal comprising: a substrate having a concave surface; the abradable material; and a bondcoat between the abradable material and the concave surface.

The features of the various aspects and embodiments may further be combined in any physically possible combination. And such combinations may include one or more of structure, properties, use steps, manufacture parameters, manufacture steps, and the like.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Current abradable system pairs are a limiting factor for high pressure compressor (HPC) development. Further increasing compression in new engine designs involves increasing temperatures to the point of causing diffusion reaction and hot corrosion (particularly in the presence of environmental salts, most significantly such as when operating in coastal areas and/or desert areas (where dust-borne contaminants are an issue)). Sulfur compounds (e.g., sulfur dioxide, sulfates, sulfides, and the like) such as in polluted environments are also problems. In such conditions, it may be desirable to replace the baseline cBN with a more environmentally robust abrasive. Despite a high sublimation point of 3,246 K, cBN can suffer failures at lower temperatures. For example, conventional cBN abrasives operate well at temperatures in the range of 400 K to 900 K. At higher temperatures, (e.g., above 900K), oxidation starts to occur. Also, there can be reactions between the cBN and the matrix holding it (e.g., nickel or nickel alloy). At or above 1000 K, life will be very short.

Figure 1:
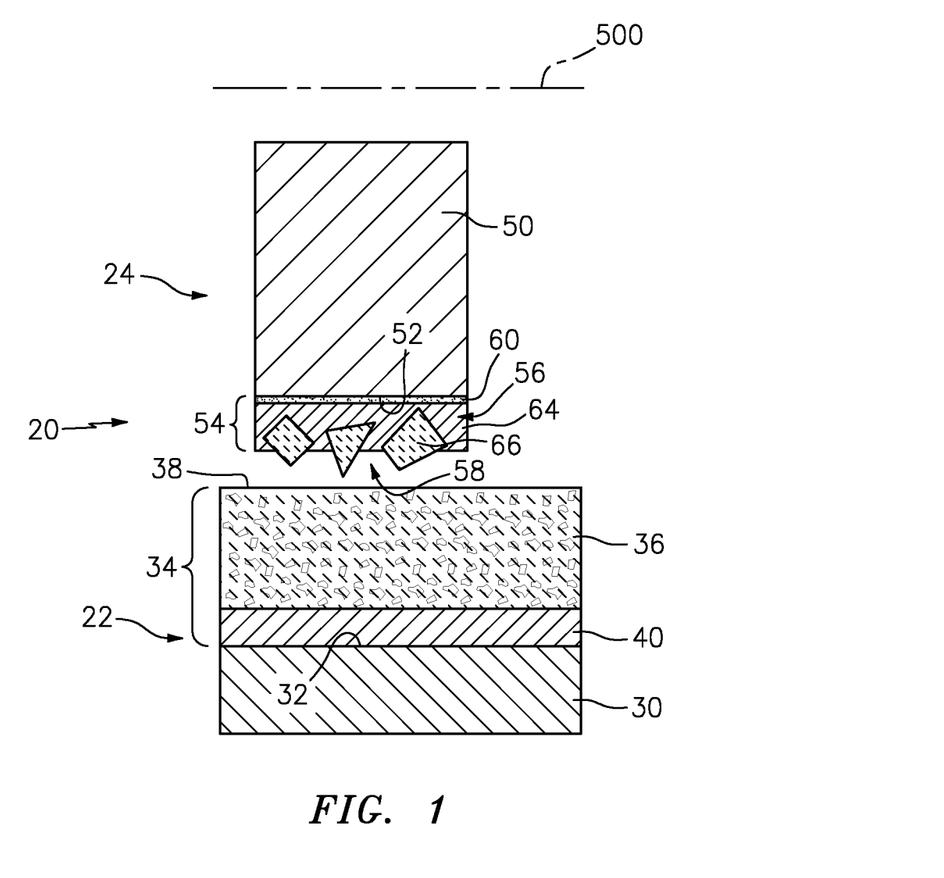
FIG. 1 is a schematic sectional view of a blade rub interaction in a gas turbine engine.

FIG. 1 shows a turbomachine 20 first member 22 as a non-rotating shroud (e.g., segmented blade outer air seal (BOAS)) and second member 24 as a rotating blade. The first member 22 comprises a substrate 30 (e.g., metallic, such as nickel-based superalloy) having a surface 32. Along a portion of the surface 32 (e.g., a BOAS segment inner diameter (ID) surface in the example), the surface 32 bears a first coating system 34. The first system 34 includes an abradable coating (coating layer) 36 having an exposed surface 38. A bondcoat 40 (e.g., thermal sprayed MCrAlY or diffusion aluminide) may intervene between abradable coating 36 and the substrate 30.

Figure 1A:
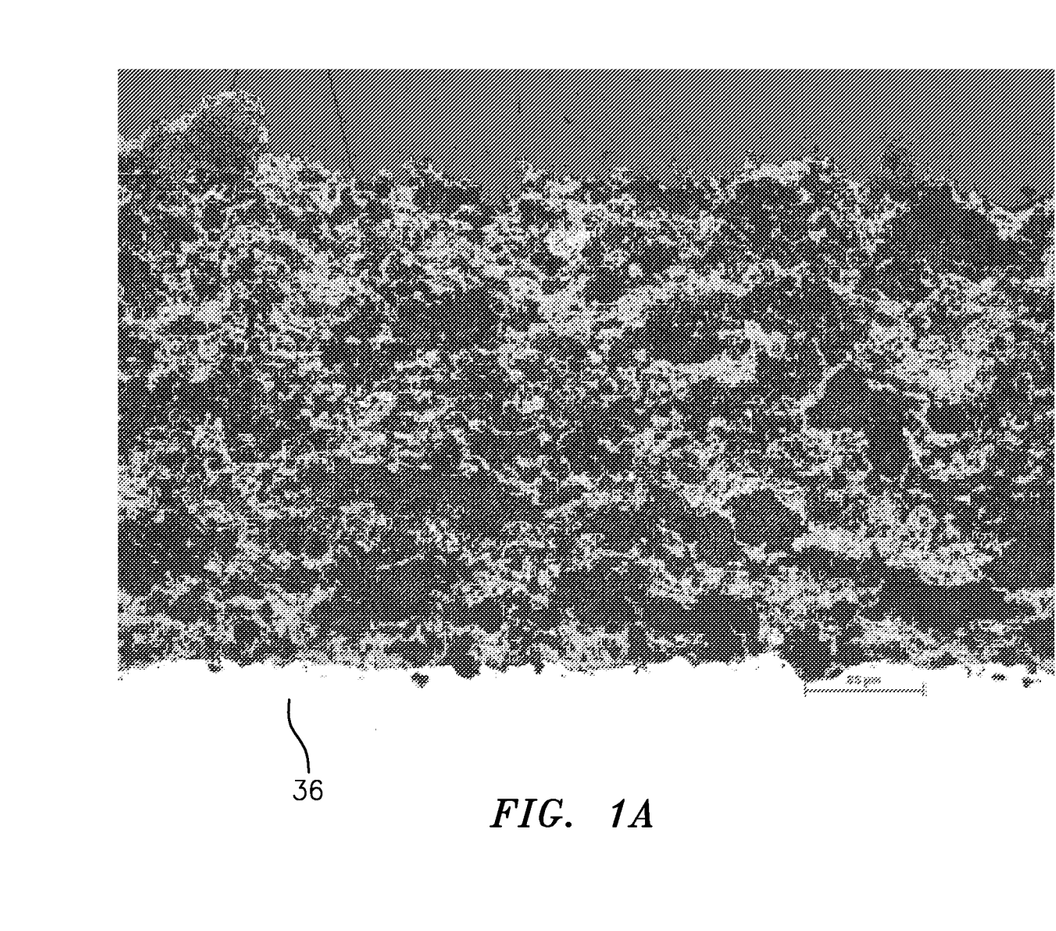
FIG. 1A is a micrograph of an abradable coating on one of two rubbing members in the interaction.
Figure 1B:
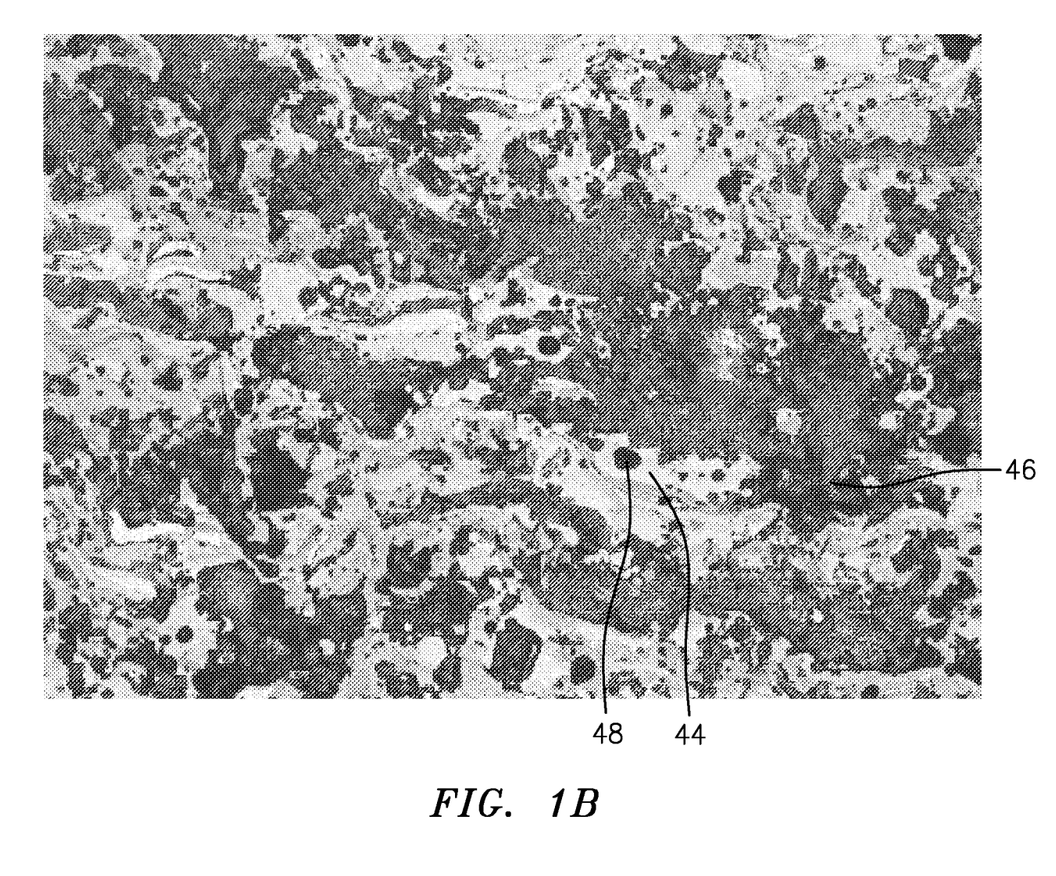
FIG. 1B is a four times further enlarged view of the micrograph of FIG. 1A.

The abradable coating 36 includes a ceramic 44 (FIG. 1A/1B) and optional filler 46 along with porosity 48. For ease of reference, the ceramic 44 will be referred to as a matrix or matrix phase even where there is no filler. In examples discussed below, the filler 46 is also ceramic (ceramic filler). The FIG. 1A/1B example is rutile titania ceramic 44 and hBN filler 46. In a thermal spray deposition of the abradable coating 36 the porosity will include a component merely due to the spray parameters and a component due to the inclusion of a fugitive powder (if any) in the spray feedstock. In use or in a pre-use heating, the fugitive is vaporized or decomposed to leave porosity. Example fugitives are polymers such as polyesters and/or acrylics (example fugitive content as applied is 10% to 20% by volume, more broadly 5.0% to 25.0%). Overall, the two-(or more)-component abradable may be 100% ceramic or an example at least 95% or at least 90% by weight (particularly after fugitive removal). Example by weight matrix content is at least 20% or at least 25% or at least 35% and may be as high as 75%.

The second member 24 comprises a substrate 50 (e.g., metallic, such as nickel-based superalloy) having a surface 52. Along a portion of the surface 52 (e.g., an airfoil tip surface in the example), the surface 52 bears a second coating system 54. The second system 54 includes an abrasive coating (coating layer) 56 having an exposed surface 58. A bondcoat 60 may intervene between abrasive coating 56 and the substrate. The presence and nature of a bondcoat 60 will be influenced by the nature and application technique of the matrix. The bondcoat may be an initial plating or strike of matrix material.

The abrasive coating 56 (FIG. 1) includes a metallic matrix 64 and a ceramic oxide abrasive 66 (replacing a baseline cBN) held by the matrix (e.g., as discrete particles within the matrix and optionally protruding at the surface 58. Example by weight abrasive content is at least 5% or at least 10%. Example upper limits for ranges using either of those lower limits are 60% or 50% or 40%. Broadly, the abrasive content may be effective from about 5 v % to 80 v % depending on application and method of manufacture, more narrowly 20 v % to 70 v %. The first member 22 and second member 24 are mounted for relative rotation about an axis 500 (engine centerline) with the abrasive coating facing or contacting the abradable coating.

In endeavoring to find a coating pair compatible with higher temperatures, there are competing considerations. Increasing the temperature capability of any given material potentially affects the performance of other materials. For example, it may increase the temperature-independent component of wear on other materials or it may exacerbate the temperature increase. For example, an increase in compression will thermodynamically correspondingly increase temperature at the last stage of the compressor. The increased material temperature capability may cause an increase in the operating temperature of the rub interface beyond that thermodynamic increase in local engine temperature.

We theorize that the material selections are bounded by two factors: the melting point of the abradable matrix 44 relative to the operating temperature (e.g., gas temperature measured via thermocouple); and the relative melting points of the abradable matrix 44 and abrasive particles 66.

Operating temperature should be no more than 80% (sintering occurring) of the abradable constituents' (matrix and filler) absolute melting point(s). More particularly, the operating temperature would be 75% or two thirds or less or 60% or less or 50% or less. This will reduce sintering and improve durability of the abradable coating. At 50% or less there should be essentially no sintering.

The abrasive melting point should be at least 400 Kelvin (K) greater than the abradable matrix melting point. When looking at multi-ceramic systems, this may be further defined. There may be multiple ceramic abrasives and all need not have this relation to the matrix. Similarly, in the abradable some ceramics, particularly the filler, may not have this relationship. Thus, this relationship may exist for an example at least 50% by weight (or at least 75% or at least 90% or at least 95% or 100%) of the ceramic abrasive and at least 20% by weight of the ceramic of the abradable (again with a full continuum of higher levels of 25% or further 5% increments up to 100%). When looking only at ceramic matrix, this relationship may exist for an example at least 50% by weight (or at least 75% or at least 90% or at least 95% or 100%) of the ceramic abrasive and at least 80% by weight of the ceramic matrix of the abradable (again with a full continuum of higher levels of 85% or further 5% increments up to 100% or at least 98%). Particular examples in the tables below highlight the relevance of these numbers.

Such melting point differences for material pairs are shown in Table I below. In addition to showing melting points, Table I also includes data reflecting the conventional requirement that the abrasive 66 is harder than the abradable matrix 44. The table shows Mohs data (nearest 0.5 Mohs) and reflects a minimum delta of 1.0 Mohs.

The abrasive will similarly be harder than the filler 46. Tables II and III show data with respective difference thresholds of 1.0 Mohs and 2.0 Mohs. In general, the filler will have a Mohs harness of less than 6.0 or less than 5.0.

These limitations provide for a stable abradable structure with time and temperature (low sintering of the abradable matrix) and effective cutting without excessive dulling of the abrasive. Relatively softer filler may be allowed to sinter (as it can still be cut) but not to melt.

The 400 K temperature margin relates to the softening induced by the flash temperature of asperity contact. The softening facilitates wear. Further refined melting temperature margin (delta) ranges between abrasive and abradable matrix may have upper limits influenced by the desired avoidance of abradable matrix sintering. Further refined ranges may have lower melting temperature margin limits of 500 K or 475 K or 450K. The larger the margin (melting temperature delta), the more desirable from a cutting perspective, however, the melting point margin is limited by the propensity to sinter as discussed above. An upper limit on margin is roughly open ended depending on materials and application environment. A general likelihood is that the margin will not be greater than 1850 K.

Given the options of additives and variations, the relative and absolute properties given above for the matrix phase 44, filler 46, their combination, and the abrasive 66 may be for 100% of such components or for at least 50% by weight, or at least 75% or at least 90% or at least 95%.

As secondary factors, the abradable coating 36 may be limited to 800 psi to 3000 psi (5.5 MPa to 20.7 MPa), more narrowly 1000 psi to 2000 psi (6.9 MPa to 13.8 MPa), cohesive strength to help facilitate good cutting response at high interaction rate. Cohesive strength may be measured by ASTM C633-13(2017), Standard Test Method for Adhesion or Cohesion Strength of Thermal Spray Coatings, ASTM International, West Conshohocken, Pennsylvania. Higher strength is associated with higher erosion resistance. However, higher strength is associated with damage to blades (or other rubbing parts) in a high interaction rate event, thus imposing an upper end on the desirable range. Also, abrasive matrix material, abradable coating porosity, and abradable coating soft filler content may come into play. Specifically, soft filler 46 may be incorporated into the abradable structure in a manner that reduces bonding between matrix particles in order to improve abradability while porosity and fugitive porosity formers may be used to enhance removal of matrix particles during rub interactions (for example by leaving space for particle deflection which leads to fracture wear mechanisms).

The abradable coating 36 will typically have between 20% and 50% of the matrix phase 44, by volume, depending on the material combinations, if any. The more structural contribution provided by the filler 46 (if present), the less matrix is required. There may be relevant relative properties of the matrix 44 and filler 46.

As a variation on pure hBN filler, the hBN filler may be bound by a binder such as bentonite. For example, 10%, by weight, bentonite (more broadly 5.0% to 15.0% or up to 25.0% for use in a low temperature ultimate operating environment (e.g., compressor sections which may operate at less than 1000° F. (538° C.) or less than 1500° F. (816° C.) v. turbine sections)) in a spray dried HBN agglomerate. Optionally that agglomerate can be heat treated to increase its strength. The agglomerate may then serve as spray feedstock. The bentonite may improve the economics of the spray process, making it more repeatable and improving the capture of HBN in the coating.

Magnéli phase titanium oxide (as distinguished from rutile titania ($TiO_2$)) is used in industry for its electrical properties. It may generally be represented by the formula $Ti_xO_{2x-1}$, where x is 4-9 (although some sources identify x as 4-10 or may identify it as $TiO_{1.8}$). Magnéli phase may have use in an abradable as filler. For example, an abradable coating 36 of mullite matrix 44 filled with Magnéli phase titanium oxide filler 46 (e.g., Ex. 1 in Table IV below) may have an example composition of 25 v % mullite, 50 v % Magnéli phase, 15% porosity formed from fugitive (e.g., polyester), and 10% inherent porosity from the deposition. An abradable coating made from rutile titania and incorporating only porosity (e.g., Ex. 2 in Table IV) to enhance abradability may be composed of 45 v % titania, 10% inherent porosity and 45% porosity formed from fugitive (e.g., acrylic fugitive).

Magnéli phase may also find use in the matrix, particularly in a blend. As discussed below, it may be desired to apply a ceramic that is deficient in oxygen (sub-stoichiometric). An as-sprayed coating (or phase within a coating layer) with an oxygen debit may be subject to oxidation (either in-use or in a pre-use heating in an oxidative environment (e.g., heat treating in an air furnace) or both). The oxidation will expand the phase. If there is an initial tensile stress, the oxidation will reduce the stress and potentially shift into a compressive stress regime. The fully oxidized structure will be that of rutile titania.

Use of this effect of oxidation may be desirable to solve issues of spallation or cracking of ceramic coatings due to tensile stresses. In an example thermal spray coating, the tensile stresses may come from thermally induced shrinkage during cooling after molten droplet deposition, mechanical stresses or CTE mismatch with the substrate when heated and the substrate has higher CTE than the coating. Reducing coating tensile stress (and/or increasing/imposing compressive stress) at ambient conditions relative to a baseline coating allow operation at higher temperatures before a threshold spallation-inducing tensile stress is reached.

Oxygen debit in an oxide of an element is measured relative to a fully oxidized element (true stoichiometric). $TiO_{1.8}$ is nominally 10% oxygen deficient relative to the true stoichiometric (fully oxidized) $TiO_2$. Thus blends of Magnéli phase and $TiO_2$ may yield coatings of oxygen debits up to about 10% (e.g., an example debit of 3.0% to 10.0%). An oxygen debit of 10% relative to true stoichiometric yields about 3% to 4% volumetric expansion upon full oxidation. Whereas $TiO_2$ is generally regarded as having a maximum service temperature of about 1000° F. (538° C.), imposition of an ambient temperature compressive stress via inclusion of Magnéli phase will increase this limit. Depending on content, the addition may increase this to about or above 1400° F. (760° C.), more narrowly in the range of 600° C. to 800° C. or 700° C. to 800° C.

Pure Magnéli phase may be undesirable as a matrix for two reasons. Magnéli phase has a low strength and low hardness which result in poor mechanical strength and wear resistance. Also, for pure Magnéli phase in coating form the shift to compressive stress upon oxidation may be great enough to cause the coating to spall off of the substrate after oxidation. For example, after heat treatment or initial service, the coated part may return to a low temperature (e.g. ambient 21° C. or extreme cold conditions such as temperatures of −40° C. to 0° C.) whereupon the compressive stress increases sufficiently to spall. This might not occur in thin coatings of about 0.015 inch or less depending on the spray parameters used. Thus, a blend may offer sufficient hardness while limiting severe low temperature CTE mismatch problems and reducing high temperature CTE mismatch problems.

Thus, the Magnéli phase may be an example 5% to 75% by volume of the as-sprayed matrix (thus by volume of the blend), more narrowly 5% to 50% or 5% to 25% for low Magnéli or 20% to 50% for higher. Weight amounts may be similar. The expansion upon oxidation will be proportional based on that percentage to the approximately 3% to 4% noted above for the nominal Magnéli phase material. With such Magnéli blends, example combined porosity (or porosity former) and filler may be 25% to 50% by volume. This may be lower than other matrix compositions due to the relatively low fracture toughness of titania as compared with other matrix formers.

Further variations may involve a depth-wise gradient in the Magnéli phase to $TiO_2$ ratio. For example, the ratio may decrease from near the substrate to near the coating surface (e.g., so as to leave the region near the substrate or bond coat in a greater state of compression than the surface leading to improved thermal shock resistance which may be particularly important for a turbine air seal application where there is significant frictional heating during a rub event). Thus, although a pre-blend may be introduced to a single hopper/feeder, a blending feeder may draw from separate hoppers of the two.

Thus post-spray oxidation can be used to counteract both the residual tensile stress from a thermal spray deposition process and the additive CTE mismatch stresses that occur when ceramic coatings on metal substrates are used at elevated temperature.

While an abradable coating application is an example, the post-spray oxidation methods and mechanisms will be equally applicable to anti-friction coatings, anti-wear coatings, thermal barrier coatings, and environmental barrier coatings. Thus, these may lack additional abrasive of an abrasive coating or abradability-enhancing filler of an abradable coating.

While the foregoing example blend of oxygen-deficient ceramic and stoichiometric ceramic is of titanias, alternative materials could include: silica; silicates including rare earth silicates; alumina; chromia; hafnia; and partially or fully stabilized hafnia, zirconia, gadolinia and mixtures thereof. These combinations include one group where the stoichiometric material and oxygen-deficient material have the same base element (Ti in the first example) and other groups where different base elements may be used for the two.

One example of different base elements is forming zirconia toughened alumina by blending relatively oxygen-deficient zirconia with relatively stoichiometric alumina. This may be used in a wear-resistant coating such as used on clamping surfaces or as an anti-erosion coating in areas exposed to particulate impacts or on a smooth coating for a calendaring roll used in paper manufacture. The oxygen-deficient zirconia may be the minor fraction by weight and volume and the major fraction may be stoichiometric alumina. Although volume and weight fractions may be as above for the titania combinations, in further examples, the oxygen-deficient zirconia makes up from about 4 to 25 weight percent (more narrowly 5% to 15%) of the combination. In this example toughening is achieved in a thermal spray coating when the zirconia feed stock particles are smaller than the alumina particles, for example less than 50% (e.g., 25% to 50%) of the diameter (e.g., a D50 size) of the alumina when the materials have similar feed stock morphology (e.g., fused and crushed or otherwise solid. v. hollow).

The oxygen-deficient material (mixture) may be used as a layer (e.g., an environmental barrier layer) in a multilayer system such as an environmental barrier system (EBC). Non abradable system uses include other turbine engine components such as gaspath facing surfaces of blades, vanes, combustor panels and the like. When used in an application as barrier, as in an oxidation or corrosion barrier for example (e.g., atop an oxygen-scavenger layer (e.g., bondcoat layer such as having a metallic silicon content—e.g., United States Patent Application Publication 20190119803A1, Tang; et al., published Apr. 25, 2019 and entitled "Oxidation Resistant Bond Coat Layers, Processes for Coating Articles, and their Coated Articles", the disclosure of which is incorporated by reference herein in its entirety s if set forth at length) which is atop a ceramic (monolithic (e.g., silicon carbide)) or ceramic matrix composite (CMC) (e.g., silicon carbide composite such as SiC-SiC)), the volume expansion is beneficial to help counteract the shrinkage associated with sintering-caused closing of microcracks and pores. Such a layer may additionally or alternatively be used below an abradable layer. In the silicate example, the abradable layer could also be a silicate-based layer but with porosity in excess of that in the barrier layer (e.g., at least 5% porosity difference such as by adding at least 5% fugitive by volume (e.g., 5% to 25% or 10% to 20%) in the as-applied layer with a baseline porosity of the barrier layer (no fugitive or essentially none (e.g., less than 2%)) being in the vicinity of 2% to 15% or preferably 2% to 8% as applied but then decreasing to 2% or less after heat treatment)). For such silicate abradable layer, if formed using the same basic combination of the barrier layer, hBN filler may be added and bentonite may be added for coating systems at the lower end of a likely operating temperature range (e.g., up to 1200° C. in operation, thus omitting the bentonite for higher temperatures).

Further control over stress state may be achieved by controlling the extent of oxidation and temperature(s) at which it occurs during heat treatment in a controlled atmosphere. For example, an oxygen deficient silicate coating (e.g., from a blend of two silicates differing only in oxygen content) on a ceramic (e.g., silicon carbide) substrate may be sintered at a temperature of 2400° F. (1316° C.) for 4 hours with a controlled oxygen partial pressure in the atmosphere that is gradually raised (e.g., from 0.001 bar to 0.018 bar). An alternative substrate is a ceramic matrix composite (CMC, e.g., SiC—SiC) By doing this, the tensile stresses induced by sintering shrinkage may be counteracted to result in a lower flaw barrier layer that better protects the substrate from oxidation during service. An example is yttrium silicate $Y_2SiO_5$ and/or $Y_2Si_2O_7$ in stoichiometric form as the first blend constituent and in oxygen-deficient form as the second. Generally, relative to the stoichiometric constituent, the oxygen-deficient constituent may be an example 5.0% to 20.0% oxygen deficient, more narrowly 5.0% to 15.0% or 7.0% to 12.0%.

In general, the oxygen-deficient constituent ceramic may be 5% to 75% by volume or weight of the combined oxygen-deficient constituent ceramic and the stoichiometric or less deficient constituent ceramic, more narrowly an alternative minimum is 10% and alternative maxima are 25% and 50%. The post-spray oxidation may be effective to reduce the net oxygen debit by at least 50%, more narrowly, at least 75% or 90%. In general, the less oxygen deficient constituent ceramic may have a debit of less than 1.0% or, more narrowly, up to 0.50%.

Bond coat composition is somewhat arbitrary when chosen from the MCrAlY group where M is Ni, Co or combinations thereof. An example composition is Ni 22Co 17Cr 12Al 0.5Hf 0.5Y 0.4Si (commercially available as Amdry™ 386-2 by Oerlikon Metco of Pfaffikon Switzerland). The bond coat may be the limiting factor for max use temperature (measured at bond coat outer surface) in the vicinity of 1850 F or 2150 F (1283K or 1450K) when deposited by APS or HVOF respectively with the HVOF version being heat treated for 2 hrs at 1975 F (1352K) in vacuum and the APS not heat treated. Alternative application techniques include HVAF and wire spray methods. For non-MCrAlY bondcoats, (NiCr, NiCrAl, and the like) similar spray techniques may be used. The oxygen-deficient material may be applied directly to a part without bond coat alone or as a layer in a multilayer system such as an environmental barrier system (EBC).

The abrasive tip in an example is made by capturing the abrasive 66 in a matrix 64 of nickel- or cobalt-based alloy (e.g., plating such as electroplating; spray such as APS, HVAF, HVOF, and cold spray; and additive manufacturing processes such as laser fusing, brazing, and the like). The plating may contain alloying elements as either embedded particles, plating layers or may be co-deposited. An example composition is Ni22Cr6Al. More broadly, the abrasive matrix may also include MCrAlY as discussed for the bond coat for the abradable.

TABLE I

Melting Temperature Difference between Abrasive and Abradable Matrix

| Abradable Matrix Example | Max Use Temp (K) | Mohs Hardness | $T_{melt}$ (K), Delta | Abrasive Al$_2$O$_3$ Mohs Hardness 9 2323 | Cr$_2$O$_3$ 8 2708 | ZrO$_2$ 8.5 2950 | HfO$_2$ 6.5 3173 |
|---|---|---|---|---|---|---|---|
| Al$_2$O$_3$ or zirconia-toughened Al$_2$O$_3$ | 1549 | 9.0 | 2323 | 0* | 385* | 627* | 850* |
| ZrO$_2$, with and without stabilization | 1967 | 8.5 | 2950 | −627* | −242* | 0* | 223* |
| HfO$_2$ | 2115 | 6.5 | 3173 | −850* | −465* | −223* | 0* |
| TiO$_2$ (rutile) | 1427 | 6.5 | 2140 | 183* | 568 | 810 | 1033** |
| La$_2$Zr$_2$O$_7$ (pyrochlore) | 1715 | 5.5 | 2573 | −250* | 135* | 377* | 600 |
| FeTiO$_3$ (ilmenite) | 882 | 5.5 | 1323 | 1000 | 1385 | 1627 | 1850 |
| 3Al$_2$O$_3$—2SiO$_2$ (mullite) | 1409 | 7.0 | 2113 | 210* | 595 | 837 | 1060** |
| Fe$_2$SiO$_4$ (fayalite) | 1642 | 7.0 | 2463 | −140* | 245* | 487 | 710** |
| CaSiO$_3$ (wollastonite) | 1209 | 5.0 | 1813 | 510 | 895 | 1137 | 1360 |
| CaTiOSiO$_4$ (titanite) | 1105 | 5.5 | 1657 | 666 | 1051 | 1293 | 1516 |
| Na$_3$K(Al$_4$Si$_4$O$_{16}$) (nepheline) | 862 | 6.0 | 1293 | 1030 | 1415 | 1657 | 1880** |
| MgSiO$_3$ (enstatite) | 1220 | 5.5 | 1830 | 493 | 878 | 1120 | 1343 |

*Fails $T_m$ criterion
**Meets $T_m$ but fails hardness criterion
Hardness criterion: Abradable matrix hardness 1 mohs point or more lower than matrix
Temperature criterion: Melting temperature of abradable matrix 400 C. or more lower than abrasive

TABLE II

Mohs Hardness, Delta Between Abradable Coating Filler and Matrix (One Point Threshold)

| Abradable Matrix Example | $T_{melt}$ (K) | Mohs Hardness, delta | Abradable Filler hBN | CaF$_2$ (fluorite) | YPO$_4$ (xenotime) | Ca$_5$(PO$_4$)$_3$(OH) (apatite) | Cu$_2$O (cuprite) | Ti$_x$O$_{2x-1}$, where x is 4-9 (Magneli phases) |
|---|---|---|---|---|---|---|---|---|
| | | Max Use Temp (K) | 2164 | 1127 | 1512 | 1289 | 1003 | 1427 |
| | | $T_{melt}$ (K) | 3246 | 1690 | 2268 | 1933 | 1505 | 2140 |
| | | Mohs Hardness | 2.0 | 4.0 | 4.5 | 5.0 | 3.75 | 3.0 |
| Al$_2$O$_3$ or zirconia toughened Al$_2$O$_3$ | 2323 | 9.0 | −7.0 | −5.0 | −4.5 | −4.0 | −5.25 | −6.0 |
| ZrO$_2$, with and without stabilization | 2950 | 8.5 | −6.5 | −4.5 | −4.0 | −3.5 | −4.75 | −5.5 |
| HfO$_2$ | 3173 | 6.5 | −4.5 | −2.5 | −2 | −1.5 | −2.75 | −3.5 |
| TiO$_2$ (rutile) | 2140 | 6.5 | −4.5 | −2.5 | −2 | −1.5 | −2.75 | −3.5 |
| La$_2$Zr$_2$O$_7$ (pyrochlore) | 2573 | 5.5 | −3.5 | −1.5 | −1.0 | −0.5* | −1.75 | −2.5 |
| FeTiO$_3$ (ilmenite) | 1323 | 5.5 | −3.5 | −1.5 | −1.0 | −0.5* | −1.75 | −2.5 |
| 3Al$_2$O$_3$—2SiO$_2$ (mullite) | 2113 | 7.0 | −5.0 | −3.0 | −2.5 | −2.0 | −3.25 | −4.0 |
| Fe$_2$SiO$_4$ (fayalite) | 2463 | 7.0 | −5.0 | −3.0 | −2.5 | −2.0 | −3.25 | −4.0 |
| CaSiO$_3$ (wollastonite) | 1813 | 5.0 | −3.0 | −1.0 | −0.5* | 0.0* | −1.25 | −2.0 |
| CaTiOSiO$_4$ (titanite) | 1657 | 5.5 | −3.5 | −1.5 | −1.0 | −0.5* | −1.75 | −2.5 |
| Na$_3$K(Al$_4$Si$_4$O$_{16}$) (nepheline) | 1293 | 6.0 | −4.0 | −2.0 | −1.5 | −1.0 | −2.25 | −3.0 |
| MgSiO$_3$ (enstatite) | 1830 | 5.5 | −3.5 | −1.5 | −1.0 | −0.5* | −1.75 | −2.5 |

*Fails criterion
Hardness criterion: Filler hardness 1 Mohs point or more lower than matrix
Max use temperature = 0.667 × $T_{melt}$

TABLE III

Mohs Hardness, Delta Between Abradable Coating Filler and Matrix (Two Point Threshold)

| | | | Abradable Filler | | | | | |
|---|---|---|---|---|---|---|---|---|
| | | | hBN | $CaF_2$ (fluorite) | $YPO_4$ (xenotime) | $Ca_5(PO_4)_3(OH)$ (apatite) | $Cu_2O$ (cuprite) | $Ti_xO_{2x-1}$, where x is 4-9 (Magneli phases) |
| | | | \multicolumn{6}{c}{Max Use Temp (K)} | | | | | |
| | | Mohs | 2164 | 1127 | 1512 | 1289 | 1003 | 1427 |
| | | | \multicolumn{6}{c}{$T_{melt}$ (K)} | | | | | |
| Abradable Matrix Example | $T_{melt}$ (K) | Hardness, Delta | 3246 2.0 | 1690 4.0 | 2268 4.5 | 1933 5.0 | 1505 3.75 | 2140 3.0 |
| $Al_2O_3$ or zirconia-toughened $Al_2O_3$ | 2323 | 9.0 | −7.0 | −5.0 | −4.5 | −4.0 | −5.25 | −6.0 |
| $ZrO_2$, with and without stabilization | 2950 | 8.5 | −6.5 | −4.5 | −4.0 | −3.5 | −4.75 | −5.5 |
| $HfO_2$ | 3173 | 6.5 | −4.5 | −2.5 | −2.0 | −1.5* | −2.75 | −3.5 |
| $TiO_2$ (rutile) | 2140 | 6.5 | −4.5 | −2.5 | −2.0 | −1.5* | −2.75 | −3.5 |
| $La_2Zr_2O_7$ (pyrochlore) | 2573 | 5.5 | −3.5 | −1.5* | −1.0* | −0.5* | −1.75* | −2.5 |
| $FeTiO_3$ (ilmenite) | 1323 | 5.5 | −3.5 | −1.5 | −1.0* | −0.5* | −1.75* | −2.5 |
| $3Al_2O_3$—$2SiO_2$ (mullite) | 2113 | 7.0 | −5.0 | −3.0 | −2.5 | −2.0 | −3.25 | −4.0 |
| $Fe_2SiO_4$ (fayalite) | 2463 | 7.0 | −5.0 | −3.0 | −2.5 | −2.0 | −3.25 | −4.0 |
| $CaSiO_3$ (wollastonite) | 1813 | 5.0 | −3.0 | −1.0* | −0.5* | 0.0* | −1.25* | −2.0 |
| $CaTiOSiO_4$ (titanite) | 1657 | 5.5 | −3.5 | −1.5* | −1.0* | −0.5* | −1.75 | −2.5 |
| $Na_3K(Al_4Si_4O_{16})$ (nepheline) | 1293 | 6.0 | −4.0 | −2.0 | −1.5* | −1.0* | −2.25 | −3.0 |
| $MgSiO_3$ (enstatite) | 1830 | 5.5 | −3.5 | −1.5* | −1.0* | −0.5* | −1.75* | −2.5 |

*Fails criterion
Hardness criterion: Filler hardness 2 Mohs point or more lower than matrix
Max use temperature = $0.667 \times T_{melt}$

TABLE IV

Example Pairs

| | Abrasive coating volume percentages | | Abradable coating volume percentages | | |
|---|---|---|---|---|---|
| | Matrix | Abrasive | Matrix | Filler | |
| Ex. 1 | Ni22Cr6Al 70 | partially stabilized zirconia (7YSZ) 30 | mullite 25 | Magnéli phase titanium oxide 50 | |
| Ex. 2 | Ni22Cr6Al 80 | chromium oxide 20 | rutile titania 45 | none | |
| Ex. 3 | Ni22Cr6Al 65 | zirconia-toughened alumina (4 wt % zirconia) 35 | enstatite 32 | hBN 55 | |
| Ex. 4 | Ni22Cr6Al 80 | zirconia (unstabilized, e.g., commercially pure) 20 | rutile titania 35 | hBN 55 | |
| Ex. 5 | Ni phosphorus 90 | single crystal cubic boron nitride 10 | 25 Magnéli-75$TiO_2$ 60 | hBN 30 | |
| Ex. 6 | Ni 70 | zirconia (unstabilized, e.g., commercially pure) 30 | 25 Magnéli-75$TiO_2$ 65 | none | |
| Ex. 7 | Ni22Cr6Al 65 | zirconia-toughened alumina (4 wt % zirconia) 35 | 10 Magnéli-90$TiO_2$ 65 | hBN 25 | bentonite 2.5 |
| Ex. 8 | Ni 70 | zirconia (unstabilized, e.g., commercially pure) 30 | 10 Magnéli-90$TiO_2$ 65 | hBN 25 | bentonite 2.5 |
| Ex. 9 | Ni phosphorus 70 | zirconia-toughened alumina (4 wt % zirconia) 30 | 10 Magnéli-90$TiO_2$ 65 | hBN 25 | bentonite 2.5 |
| Ex. 10 | Ni phosphorus 70 | zirconia (unstabilized, e.g., commercially pure) 30 | 10 Magnéli-90$TiO_2$ 65 | hBN 25 | bentonite 2.5 |
| Ex. 11 | Ni phosphorus 70 | zirconia-toughened alumina (4 wt % zirconia) 30 | rutile titania 50 | hBN 30 | bentonite 4.0 |
| Ex. 12 | Ni phosphorus 70 | zirconia (unstabilized, e.g., commercially pure) 30 | rutile titania 45 | hBN 40 | bentonite 4.0 |

In the examples above, the abrasive is fully dense. The abradable remainder in Table IV is porosity or fugitive porosity formers (to be volatilized or burned out in use).

Other situations in which the abradable material may be used include interfacing with knife edge seals. One area of such examples include knife edges on a shrouded blade. Another is knife edges on an ID platform of a vane interfacing with an abradable on a rotor spacer outer diameter.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for forming an abradable material, the abradable material comprising:
at least 20% by volume rutile titania; and
hBN,
the method comprising:
blending a first titania powder having an oxygen debit of at least 5.0% with a second titania powder having an oxygen debit, if any, of less than 1.0%;
thermal spraying the blend; and
oxidizing the sprayed blend,
wherein oxygen debit in an oxide of an element is measured relative to a fully oxidized element.

2. The method of claim 1, wherein the abradable material further comprises:
bentonite binding said hBN wherein by weight the bentonite is between 5.0% and 25.0% of the combined bentonite and hBN.

3. The method of claim 2, wherein:
the hBN is agglomerated with the bentonite and the agglomerate is co-sprayed with the first titania powder and the second titania powder.

4. The abradable material of claim 1 comprising:
at least 10% by volume said hBN.

5. The abradable material of claim 1 comprising:
at least 35% by volume said hBN.

6. The method of claim 1 wherein:
the blending is a pre-blending.

7. The method of claim 1 wherein:
the hBN is pre-blended with the first titania powder and the second titania powder.

8. The method of claim 1 wherein:
the blend is co-sprayed with a fugitive porosity-former.

9. The method of claim 1 wherein:
the abradable material is sprayed on an inner diameter surface of a blade outer airseal substrate optionally atop a bond coat.

10. A method for coating a substrate, the method comprising:
blending a first ceramic powder having an oxygen debit of at least 5.0% with a second ceramic powder having an oxygen debit, if any, of less than 1.0%; and
thermal spraying the blend; and
oxidizing the sprayed blend to reduce a net oxygen debit by at least 50%;
or;
co-thermal spraying a first ceramic powder having an oxygen debit of at least 5.0% with a second ceramic powder having an oxygen debit, if any, of less than 1.0%, the co-thermal spraying forming a blend of the first ceramic powder and the second ceramic powder; and
oxidizing the sprayed blend to reduce a net oxygen debit by at least 50%,
wherein oxygen debit in an oxide of an element is measured relative to a fully oxidized element.

11. The method of claim 10 comprising:
said blending the first ceramic powder with the second ceramic powder; and
said thermal spraying the blend; and
said oxidizing the sprayed blend.

12. The method of claim 10 wherein:
the first ceramic powder forms 5% to 50% by weight of the combined first ceramic powder and second ceramic powder in the blend; and
the second ceramic powder forms 50% to 95% by weight of the combined first ceramic powder and second ceramic powder in the blend.

13. The method of claim 10 wherein:
the first ceramic powder and the second ceramic powder combine to form at least 40% by volume of a layer sprayed from the blend.

14. The method of claim 10 wherein:
the first ceramic powder is Magnéli phase titania; and
the second ceramic powder is $TiO_2$.

15. A method for coating a substrate, the method comprising:
blending a first ceramic powder having an oxygen debit of at least 5.0% with a second ceramic powder having an oxygen debit, if any, of less than 1.0%; and
thermal spraying the blend;
or;
co-thermal spraying a first ceramic powder having an oxygen debit of at least 5.0% with a second ceramic powder having an oxygen debit, if any, of less than 1.0%, the co-thermal spraying forming a blend of the first ceramic powder and the second ceramic powder, wherein:
oxygen debit in an oxide of an element is measured relative to a fully oxidized element; and
the first ceramic powder forms 5% to 75% by volume of the as-sprayed blend.

16. A method for coating a substrate, the method comprising:
blending a first ceramic powder having an oxygen debit of at least 5.0% with a second ceramic powder having an oxygen debit, if any, of less than 1.0%; and
thermal spraying the blend;
or;
co-thermal spraying a first ceramic powder having an oxygen debit of at least 5.0% with a second ceramic powder having an oxygen debit, if any, of less than 1.0%, the co-thermal spraying forming a blend of the first ceramic powder and the second ceramic powder, wherein:
oxygen debit in an oxide of an element is measured relative to a fully oxidized element; and
the first ceramic powder and the second ceramic powder are oxides or silicates of different elements.

17. The method of claim 16 wherein:
the first ceramic powder is a zirconia and the second ceramic powder is an alumina.

18. A method for coating a substrate, the method comprising:
blending a first ceramic powder having an oxygen debit of at least 5.0% with a second ceramic powder having an oxygen debit, if any, of less than 1.0%; and
thermal spraying the blend;
or;
co-thermal spraying a first ceramic powder having an oxygen debit of at least 5.0% with a second ceramic powder having an oxygen debit, if any, of less than 1.0%, the co-thermal spraying forming a blend of the first ceramic powder and the second ceramic powder, wherein:
  oxygen debit in an oxide of an element is measured relative to a fully oxidized element; and
  the first ceramic powder and the second ceramic powder are oxides or silicates of the same element.

19. The method of claim 18 wherein:
the first ceramic powder is a silicate; and
the second ceramic powder is a silicate.

20. The method of claim 19 wherein:
the first ceramic powder is a yttrium silicate; and
the second ceramic powder is a yttrium silicate.

* * * * *